United States Patent
Jin et al.

(10) Patent No.: US 12,526,866 B2
(45) Date of Patent: Jan. 13, 2026

(54) METHOD AND DEVICE FOR SEGMENTING DOWNLINK RADIO RESOURCE CONTROL MESSAGE IN NEXT-GENERATION MOBILE COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 452 days.

(21) Appl. No.: 17/755,919

(22) PCT Filed: Nov. 9, 2020

(86) PCT No.: PCT/KR2020/015644
§ 371 (c)(1),
(2) Date: May 11, 2022

(87) PCT Pub. No.: WO2021/096184
PCT Pub. Date: May 20, 2021

(65) Prior Publication Data
US 2022/0394799 A1 Dec. 8, 2022

(30) Foreign Application Priority Data
Nov. 13, 2019 (KR) .................. 10-2019-0144784

(51) Int. Cl.
*H04W 76/20* (2018.01)
*H04W 28/06* (2009.01)
*H04W 76/19* (2018.01)

(52) U.S. Cl.
CPC ........... *H04W 76/19* (2018.02); *H04W 28/06* (2013.01); *H04W 76/20* (2018.02)

(58) Field of Classification Search
CPC .............................. H04W 76/19; H04W 76/20
(Continued)

(56) References Cited

U.S. PATENT DOCUMENTS

| 8,693,308 B2 | 4/2014 | Hourtane et al. |
| 9,750,063 B2 | 8/2017 | Zhu et al. |

(Continued)

FOREIGN PATENT DOCUMENTS

| CN | 104022906 A | 9/2014 |
| CN | 104508996 A | 4/2015 |

(Continued)

OTHER PUBLICATIONS

3GPP TSG-RAN2 Meeting #108 R2-1915760 Reno, NV, USA, Nov. 8, 2019 (Year: 2019).*

(Continued)

*Primary Examiner* — Sibte H Bukhari

(57) ABSTRACT

The disclosure relates to a communication technique for convergence between an IoT technology and a 5G communication system for supporting higher data transmission rate than a 4G system, and a system thereof. The disclosure may be applied to intelligence services (e.g., smart homes, smart buildings, smart cities, smart cars or connected cars, healthcare, digital education, retail businesses, security and safety related services, etc.) on the basis of a 5G communication technology and an IoT-related technology. According to an embodiment of the present discourse, a method of a terminal in a communication system may comprise the steps of: receiving, from a base station, at least one segmented radio resource control (RRC) message including a part of an RRC message which has a size larger than a preconfigured size; storing the at least one received segmented RRC message; identifying that a radio link failure (RLF) has occurred with respect to the base station; and discarding the stored seg- (Continued)

mented RRC message upon the occurrence of the radio link failure.

6 Claims, 14 Drawing Sheets

(58) Field of Classification Search
USPC .......................................................... 370/329
See application file for complete search history.

(56) References Cited

U.S. PATENT DOCUMENTS

| | | | |
|---|---|---|---|
| 10,368,279 | B2 | 7/2019 | Fujishiro et al. |
| 10,863,394 | B2 | 12/2020 | Kim et al. |
| 10,966,126 | B2 | 3/2021 | Kim et al. |
| 11,582,603 | B2 | 2/2023 | Ryoo et al. |
| 2005/0153696 | A1* | 7/2005 | Chao ............... H04L 1/1809 370/473 |
| 2019/0230732 | A1* | 7/2019 | Yu .................... H04W 74/08 |
| 2020/0355834 | A1 | 11/2020 | Jin et al. |
| 2022/0295592 | A1* | 9/2022 | Fujishiro ........... H04W 36/34 |

FOREIGN PATENT DOCUMENTS

| | | |
|---|---|---|
| CN | 109565896 A | 4/2019 |
| CN | 110178335 A | 8/2019 |
| EP | 3361820 A1 | 8/2018 |
| KR | 10-2017-0071844 A | 6/2017 |
| KR | 10-2020-0128977 A | 11/2020 |
| WO | 2017131046 A1 | 8/2017 |
| WO | 2017200326 A1 | 11/2017 |
| WO | 2018128441 A1 | 7/2018 |

OTHER PUBLICATIONS

3GPP TSG-RAN2 Meeting#108 R2-1915760 Reno, NV,USA, Nov. 8, 2019 (Year:2019) (Year: 2019).*
Notification of the First Office Action dated Jun. 1, 2024, in connection with Chinese Application No. 202080078124.5, 12 pages.
ETSI MCC, "Report of 3GPP TSG RAN2 #106 meeting, Reno, USA," R2-1908601, 3GPP TSG-RAN WG2 meeting #107, May 13-17, 2019, 295 pages.
NTT Docomo Inc, "New Radio (NR) Access Technology," RP-171505, 3GPP TSG RAN meeting #76, West Palm Beach, USA, Jun. 5-8, 2017, 218 pages.
Samsung, "SRB Type for the Segmented UECapabilityInformation," R2-1911355 (Revision of R2-1907721), 3GPP TSG-RAN WG2 Meeting #107, Prague, Czech Republic, Aug. 24-30, 2019, 4 pages.
International Search Report and Written Opinion of the International Searching Authority dated Feb. 22, 2021, in connection with International Application No. PCT/KR2020/015644, 10 pages.
Ericsson, "Introduction of RRC segmentation in LTE-Uplink," R2-1910899, Revision of R2-1907328, 3GPP TSG-RAN WG2 Meeting #107, Prague, Czech Republic, Aug. 26-30, 2019, 10 pages.
Ericsson, et al., "Introduction of RRC Segmentation—Downlink," R2-1915760 (Revision of R2-1912833), 3GPP TSG-RAN2 Meeting #108, Reno, NV, USA, Nov. 18-22, 2019, 67 pages.
Samsung, "Transfer of segmented UECapabilityInformation by SRB2," R2-1915246 (Revision of R2-1912513), 3GPP TSG-RAN WG2 Meeting #108, Reno, US, Nov. 18-22, 2019, 4 pages.
3GPP TS 38.323 V15.6.0 (Jun. 2019), Technical Specification, 3rd Generation Partnership Project; Technical Specification Group Radio Access Network; NR; Packet Data Convergence Protocol (PDCP) specification (Release 15) Jun. 2019, 26 pages.
Notification of the Second Office Action issued Nov. 25, 2024, in connection with Chinese Patent Application No. 202080078124.5, 9 pages.
Office Action issued Feb. 24, 2025, in connection with Korean Patent Application No. 10-2019-0144784, 7 pages.
Notification of the Third Office Action issued Mar. 31, 2025, in connection with Chinese Patent Application No. 202080078124.5, 12 pages.
Nokia, "Security for RRC suspend and RRC resume," S3-160532, 3GPP TSG-SA3 Meeting #83, Los Cabos, Mexico, May 9-13, 2016, 6 pages.
NTT Docomo, Inc., " Status Report of Study on New Radio Access Technology," RP-170376, 3GPP TSG RAN meeting #75, Dubrovnik, Croatia, Mar. 6-9, 2017, 157 pages.
Ericsson, "RRC re-establishment for CP NB-IoT," S3-170256, 3GPP TSG-SA3 Meeting #86, Sophia Antipolis, France, Feb. 6-10, 2017, 8 pages.
Office Action dated Jun. 26, 2025, in connection with Chinese Application No. 202080078124.5, 12 pages.
Office Action dated Oct. 24, 2025, in connection with Korean Application No. 10-2019-0144784, 7 pages.

* cited by examiner

METHOD AND DEVICE FOR SEGMENTING DOWNLINK RADIO RESOURCE CONTROL MESSAGE IN NEXT-GENERATION MOBILE COMMUNICATION SYSTEM

CROSS-REFERENCE TO RELATED APPLICATIONS

This application is a 371 National Stage of International Application No. PCT/KR2020/015644, filed Nov. 9, 2020, which claims priority to Korean Patent Application No. 10-2019-0144784, filed Nov. 13, 2019, the disclosures of which are herein incorporated by reference in their entirety.

BACKGROUND

1. Field

The disclosure relates to a mobile communication system and, particularly, proposes a method of segmenting and delivering, by a base station, a downlink RRC reconfiguration message and a terminal operation.

2. Description of Related Art

In order to satisfy wireless data traffic demands that tend to increase after 4G communication system commercialization, efforts to develop an enhanced 5G communication system or a pre-5G communication system are being made. For this reason, the 5G communication system or pre-5G communication system is called a beyond 4G network communication system or a post LTE system. In order to achieve a high data transfer rate, an implementation of the 5G communication system in a mmWave band (e.g., 60 Giga (60 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system. In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

Meanwhile, the Internet evolves from a human-centered connection network over which human generates and consumes information to Internet of things (IoT) through which information is exchanged and processed between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, technologies, such as a sensor network, machine to machine (M2M) and machine type communication (MTC), are implemented by schemes, such as beamforming, MIMO, and an array antenna, that is, 5G communication technologies. The application of a cloud radio access network (cloud RAN) as the aforementioned big data processing technology may be said to be an example of convergence between the 5G technology and the IoT technology.

SUMMARY

There is introduced a method of segmenting and delivering a UE capability information message when UE capability information is greater than a maximum size of a PDCP SDU with respect to a series of procedures of receiving, by the UE, a request for UE capability from a base station and reporting the UE capability in an NR system. Likewise, a case where configuration information is greater than a maximum size of a PDCP SDU may occur even in the case of a downlink RRC message. A method of segmenting and delivering the downlink RRC message is not currently supported. Furthermore, an operation of a UE needs to be defined when the segmentation of a downlink RRC message is permitted.

A method of a user equipment in a communication system according to an embodiment of the disclosure may include receiving, from a base station, at least one segmented radio resource control (RRC) message including a part of an RRC message greater than a preset size, storing the received at least one segmented RRC message, identifying whether a radio link failure (RLF) has occurred with respect to the base station, and discarding the stored segmented RRC message based on the occurrence of the RLF.

According to an embodiment, the RLF may be an RLF related to a master cell group (MCG).

According to an embodiment, the RRC message may be an RRCReconfiguration message or an RRCResume message.

According to an embodiment, the occurrence of the RLF may be identified in a state in which a last segmented RRC message related to the RRC message has not been received from the base station.

Furthermore, a method of a base station in a communication system according to an embodiment of the disclosure may include generating a radio resource control (RRC) message to be transmitted to a user equipment (UE), generating at least one segmented RRC message including a part of the RRC message based on the size of the RRC message being greater than a preset size, and transmitting the at least one segmented RRC message to the UE. The at least one segmented RRC message transmitted to the UE may be discarded by the UE based on a radio link failure (RLF) occurring with respect to the base station.

Furthermore, a user equipment (UE) of a communication system according to an embodiment of the disclosure may include a transceiver unit, and a controller configured to receive, from a base station, at least one segmented radio resource control (RRC) message including a part of an RRC message greater than a preset size, store the received at least one segmented RRC message, identify a radio link failure (RLF) having occurred with respect to the base station, and discard the stored segmented RRC message based on the occurrence of the RLF.

Furthermore, a base station of a communication system according to an embodiment of the disclosure may include a transceiver unit, and a controller configured to generate a radio resource control (RRC) message to be transmitted to a user equipment (UE), generate at least one segmented RRC message including a part of the RRC message based on the size of the RRC message being greater than a preset size, and enable the at least one segmented RRC message to be transmitted to the UE. The at least one segmented RRC message transmitted to the UE may be discarded by the UE based on a radio link failure (RLF) occurring with respect to the base station.

According to the disclosure, as a downlink (DL) segmented RRC message is introduced in an NR system, a downlink RRC message greater than a maximum size of a PDCP SDU can also be generated and delivered. As a UE operation for the DL segmented RRC message is defined, a base station can deliver a lot of configuration information to a UE without a problem even with a small delay time.

DETAILED DESCRIPTION

Hereinafter, an operation principle of the disclosure is described in detail with reference to the accompanying drawings. In the following description of the disclosure, a detailed description of a related known function or configuration will be omitted if it is deemed to make the subject matter of the disclosure unnecessarily vague. For the same reason, in the accompanying drawings, some components are enlarged, omitted or schematically depicted. Furthermore, the size of each component does not accurately reflect its real size. Furthermore, terms to be described hereinafter are defined by taking into consideration functions in the disclosure, and may be different depending on a user, an operator's intention or practice. Accordingly, each term should be defined based on contents over the entire specification. Hereinafter, a term for identifying a connection node, terms to denote network entities, terms to denote messages, a term to denote an interface between network entities, terms to denote various types of identification information, etc., which are used in the description, have been exemplified for convenience of description. Accordingly, the disclosure is not limited to terms described later, and another term to denote a target having an equivalent technical meaning may be used.

In the disclosure, terms and names defined in the 3rd generation partnership project long term evolution (3GPP LTE) standard are used for convenience of description. However, the disclosure is not limited to the terms and names and may be identically applied to a system according to another standard.

Figure 1:
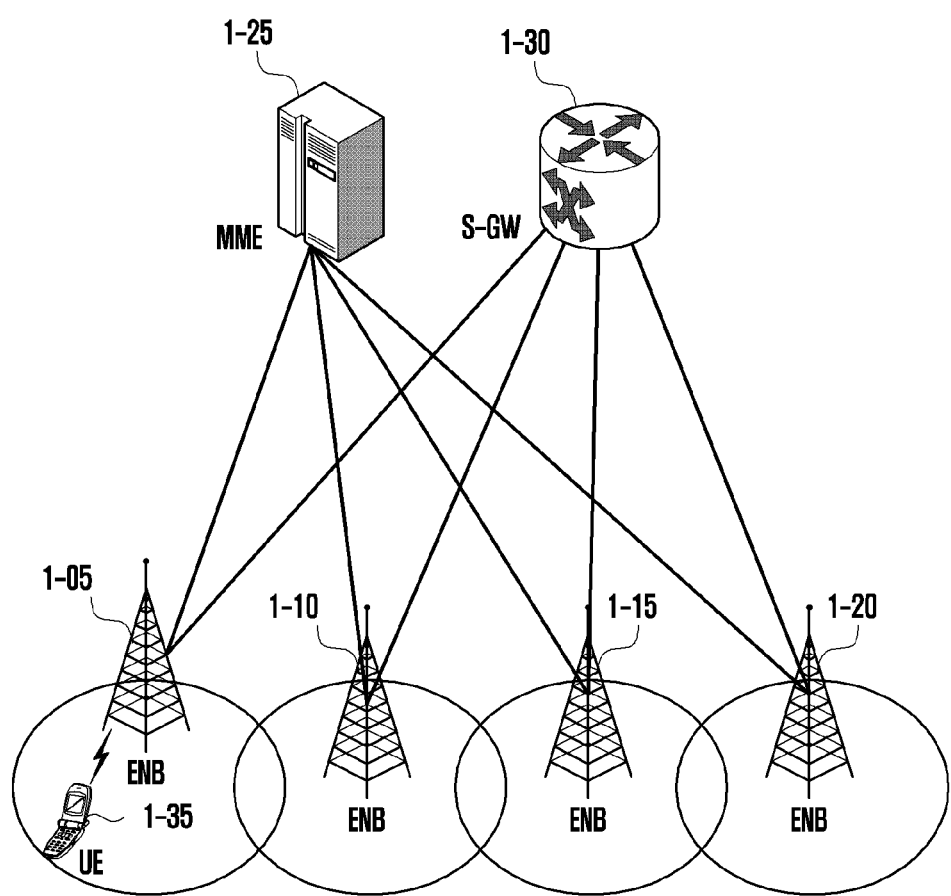
FIG. 1 is a diagram illustrating a configuration of an LTE system according to an embodiment of the disclosure.

FIG. 1 is a diagram illustrating a configuration of an LTE system according to an embodiment of the disclosure.

With reference to FIG. 1, as illustrated, a radio access network of the LTE system consists of evolved node Bs (hereinafter referred to as an "eNB", a "Node B" or a "base station") 1-05, 1-10, 1-15, 1-20), a mobility management entity (MME) 1-25 and a serving-gateway (S-GW) 1-30. A user equipment (hereinafter a UE or a terminal) 1-35 accesses an external network through the eNBs 1-05 to 1-20 and the S-GW 1-30.

In FIG. 1, the eNBs 1-05 to 1-20 correspond to the existing node Bs of an UMTS system. The eNB is connected to the UE 1-35 through a wireless channel, and performs a more complicated role than the existing node B. In the LTE system, all types of user traffic including a real-time service, such as a voice over IP (VoIP) through an Internet protocol, are served through a shared channel. Accordingly, there is a need for an apparatus for performing scheduling by collecting state information, such as buffer states, available transmission power states, and channel states of UEs, which is handled by the eNBs 1-05 to 1-20. In general, one eNB controls multiple cells. For example, in order to implement a transmission speed of 100 Mbps, an LTE system uses orthogonal frequency division multiplexing (hereinafter referred to as "OFDM") as a wireless access technology in a 20 MHz bandwidth. Furthermore, an adaptive modulation & coding (hereinafter referred to as "AMC") scheme for determining a modulation scheme and a channel coding rate based on a channel state of a UE is applied. The S-GW 1-30 is an apparatus for providing a data bearer, and generates or removes a data bearer under the control of the MME 1-25. The MME is an apparatus responsible for various control functions in addition to a mobility management function for a UE, and is connected to multiple base stations.

Figure 2:
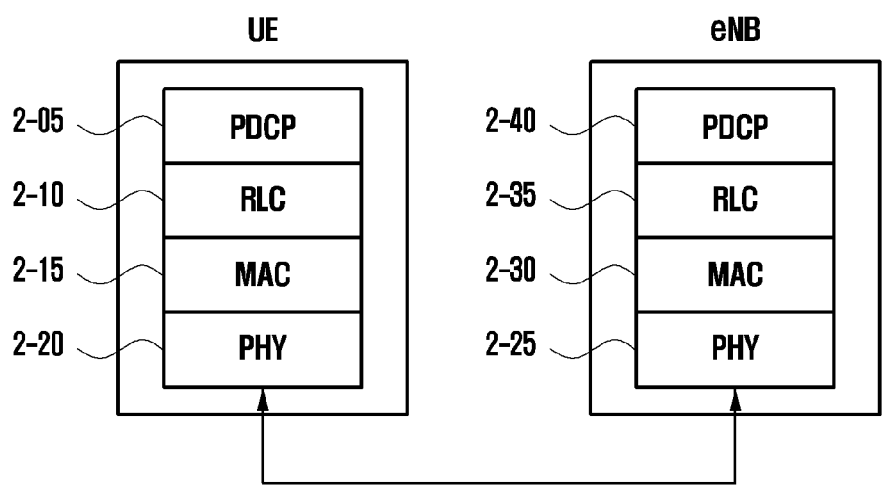
FIG. 2 is a diagram illustrating radio protocol architecture in an LTE system according to an embodiment of the disclosure.

FIG. 2 is a diagram illustrating radio protocol architecture in an LTE system according to an embodiment of the disclosure.

With reference to FIG. 2, the radio protocol of the LTE system consists of packet data convergence protocols (PDCPs) 2-05 and 2-40, radio link control (RLC) 2-10 and 2-35, medium access control (MAC) 2-15 and 2-30 in a UE and an eNB, respectively. The PDCP 2-05, 2-40 handles an operation, such as IP header compression/restoration. Major functions of the PDCP are summarized as follows.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink Radio link control (hereinafter referred to as "RLC") 2-10 and 2-35 performs an ARQ operation, etc. by reconfiguring a PDCP packet data unit (PDU) as a proper size. Major functions of the RLC are summarized as follows.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 2-15, 2-30 is connected to several RLC layer apparatuses configured in one UE, and performs an operation of multiplexing RLC PDUs into a MAC PDU and demultiplexing RLC PDUs from a MAC PDU. Major functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channel s
Scheduling information reporting
Error correction through HARQ
Priority handling between logical channels of one UE
Priority handling between UEs by means of dynamic scheduling
MBMS service identification
Transport format selection
Padding The PHY layer 2-20, 2-25 performs an operation of channel-coding and modulating higher layer data, generating the higher layer data into an OFDM symbol, transmitting the OFDM symbol through a wireless channel or demodulating an OFDM symbol received through a wireless channel, channel-decoding the OFDM symbol, and transmitting the OFDM symbol to a higher layer. Furthermore, a hybrid ARQ (HARQ) is used for additional error correction even in the PHY layer. A reception stage transmits whether a packet transmitted by a transmission stage has been received by using 1 bit. This is called HARQ ACK/NACK information. Downlink HARQ ACK/NACK information for uplink transmission is transmitted through a physical hybrid-ARQ indicator channel (PHICH) physical channel. Uplink HARQ ACK/NACK information for downlink transmission may be transmitted through a physical uplink control channel (PUCCH) or a physical uplink shared channel (PUSCH) physical channel.

Meanwhile, the PHY layer may consist of one or a plurality of frequencies/carriers. A technology which simultaneously configures and uses a plurality of frequencies is called a carrier aggregation (hereinafter referred to as a "CA"). The CA technology can significantly increase the transfer rate by the number of secondary carriers by additionally using a primary carrier and one or a plurality of secondary carriers, instead of using only one carrier for communication between a terminal (or a user equipment (UE)) and a base station (an E-UTRAN NodeB or an eNB). Meanwhile, in LTE, a cell within a base station using a primary carrier is called a primary cell (PCell), and a secondary carrier is called a secondary cell (SCell).

Although not illustrated in this drawing, a radio resource control (hereinafter referred to as "RRC") layer is present over the PDCP layer of each of the UE and the base station. The RRC layers may be connected for radio resource control and may exchange measurements-related configuration control messages.

Figure 3:
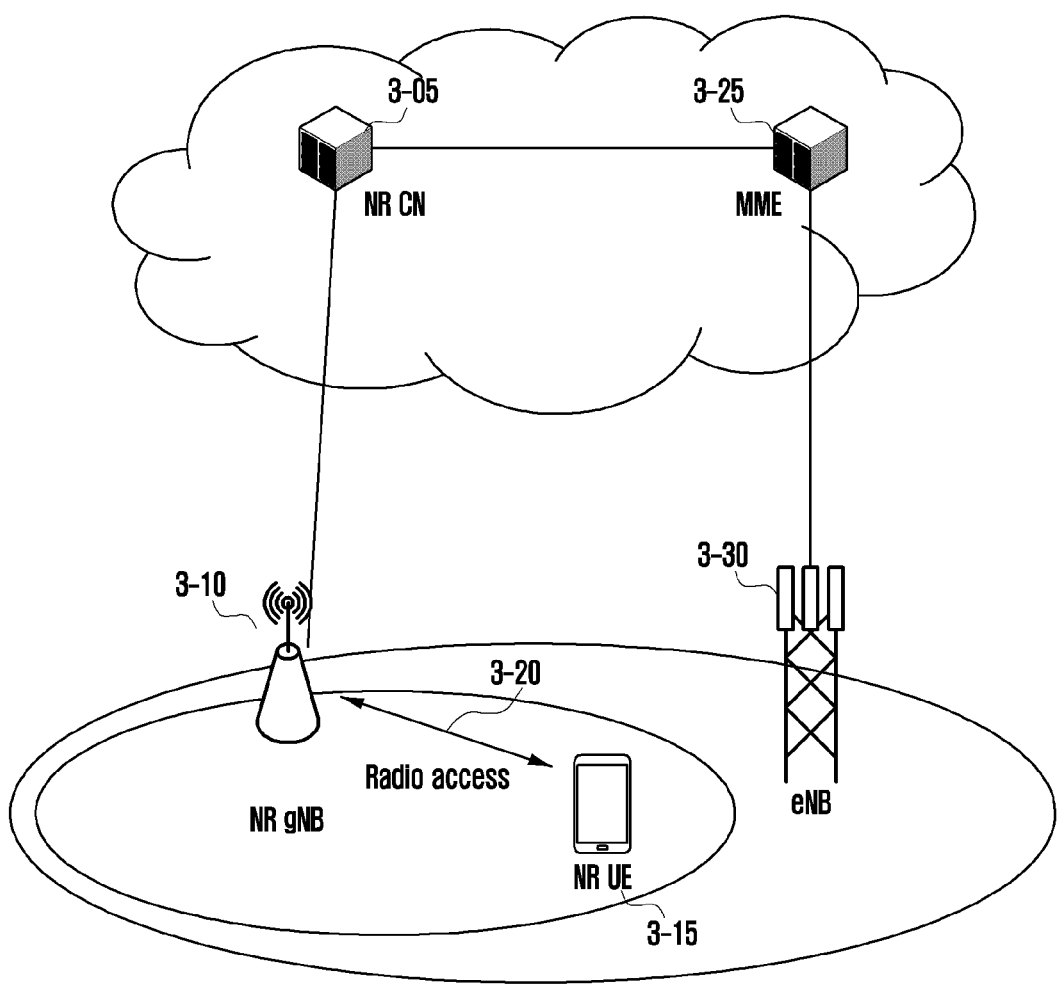
FIG. 3 is a diagram illustrating a configuration of a next-generation mobile communication system according to an embodiment of the disclosure.

FIG. 3 is a diagram illustrating a configuration of a next-generation mobile communication system according to an embodiment of the disclosure.

With reference to FIG. 3, as illustrated, a radio access network of the next-generation mobile communication system consists of a new radio node B (hereinafter referred to as "NR NB") 3-10 and a new radio core network (NR CN or a next generation core network (NG CN) 3-05. A new radio user equipment (hereinafter referred to as "NR UE" or a terminal) 3-15 accesses an external network through the NR NB 3-10 and the NR CN 3-05.

In FIG. 3, the NR NB 3-10 corresponds to an evolved node B (eNB) of the existing LTE system. The NR NB is connected to the NR UE 3-15 through a wireless channel, and can provide more excellent services than the existing node B. In the next-generation mobile communication system, all types of user traffic are served through a shared channel. Accordingly, there is a need for an apparatus for performing scheduling by collecting state information, such as buffer states, available transmission power states, and channel states of UEs, which is handled by the NR NB 3-10. In general, one NR NB controls multiple cells. In order to implement ultra-high speed data transmission compared to the existing LTE, the existing maximum bandwidth or more may be used, and a beamforming technology may be additionally grafted by using orthogonal frequency division multiplexing (hereinafter referred to as "OFDM") as a radio access technology. Furthermore, an adaptive modulation & coding (hereinafter referred to as "AMC") scheme for determining a modulation scheme and a channel coding rate based on a channel state of a UE is applied. The NR CN 3-05 performs functions, such as mobility support, a bearer configuration, and a quality of service (QoS) configuration. The NR CN is an apparatus responsible for various control functions in addition to a mobility management function for a UE, and is connected to multiple base stations. Furthermore, the next-generation mobile communication system may also operate in conjunction with the existing LTE system. The NR CN is connected to an MME 3-25 through a network interface. The MME is connected to an eNB 3-30, that is, the existing base station.

Figure 4:
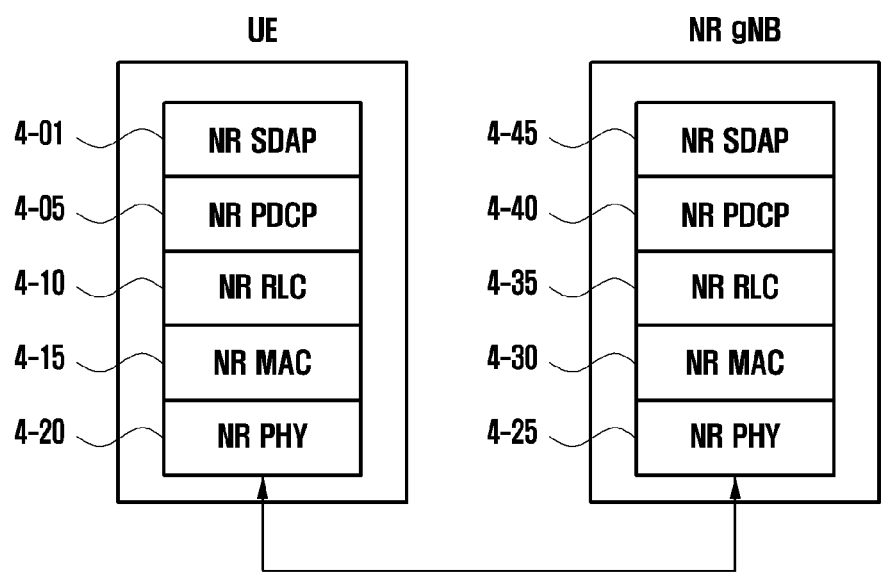
FIG. 4 is a diagram illustrating radio protocol architecture of a next-generation mobile communication system according to an embodiment of the disclosure.

FIG. 4 is a diagram illustrating radio protocol architecture of a next-generation mobile communication system according to an embodiment of the disclosure.

With reference to FIG. 4, the radio protocol of the next-generation mobile communication system consists of NR SDAPs 4-01 and 4-45, NR PDCPs 4-05 and 4-40, NR RLC 4-10 and 4-35, and NR MAC 4-15 and 4-30 in a UE and an NR base stations, respectively.

Major functions of the NR SDAP 4-01, 4-45 may include some of the following functions.
Transfer of user plane data
Mapping between a QoS flow and a DRB for both DL and UL
Marking QoS flow ID in both DL and UL packets
Reflective QoS flow to DRB mapping for the UL SDAP PDUs.

With respect to the SDAP layer apparatus, whether to use the header of the SDAP layer apparatus or whether to use a function of the SDAP layer apparatus for each PDCP layer apparatus or for each bearer or for each logical channel may be configured for the UE through an RRC message. If an SDAP header has been configured, the UE may be instructed to update or reconfigure a QoS flow of the uplink and the downlink and mapping information for a data bearer through a NAS QoS reflective configuration 1-bit indicator (NAS reflective QoS) of the SDAP header and an AS QoS reflective configuration 1-bit indicator (AS reflective QoS). The SDAP header may include QoS flow ID information indicative of QoS. The QoS information may be used as data processing priority, scheduling information, etc. for supporting a smooth service.

Major functions of the NR PDCP 4-05, 4-40 may include some of the following functions.
Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

In the aforementioned contents, the reordering of the NR PDCP apparatus refers to a function of sequentially reordering PDCP PDUs, received from a lower layer, based on a PDCP sequence number (SN) and may include a function of delivering data to a higher layer in a reordered sequence or may include a function of directly delivering data without considering a sequence, may include a function of reordering sequences and recording lost PDCP PDUs, may include a function of transmitting a state report for lost PDCP PDUs to a transmission side, and may include a function of requesting the retransmission of lost PDCP PDUs.

Major functions of the NR RLC 4-10, 4-35 may include some of the following functions.
Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the aforementioned contents, the In-sequence delivery of the NR RLC apparatus refers to a function of sequentially delivering, to a higher layer, RLC SDUs received from a lower layer, may include a function of reassembling and delivering several RLC SDUs if the original one RLC SDU is spit into the several RLC SDUs and received, may include a function of reordering received RLC PDUs based on an RLC sequence number (SN) or a PDCP sequence number (SN), may include a function of reordering sequences and recording lost RLC PDUs, may include a function of transmitting, to a transmission side, a state report for lost RLC PDUs, may include a function of requesting the retransmission of lost RLC PDUs, and may include a function of sequentially delivering, to a higher layer, only RLC SDUs up to a lost RLC SDU if the lost RLC SDU is present, or may include a function of sequentially delivering, to a higher layer, all RLC SDUs received before a given timer starts if the given timer has expired although a lost RLC SDU is present, or may include a function of sequentially delivering, to a higher layer, all RLC SDUs received so far if a given timer has expired although a lost RLC SDU is present. Furthermore, in the above contents, RLC PDUs may be processed in a received order (regardless of their sequence numbers or in order of arrival) and may be delivered to the PDCP apparatus regardless of an order (out-of sequence delivery). In the case of a segment, segments stored in a buffer or to be subsequently received may be received and reconfigured into the entire one RLC PDU, and the RLC PDU may be then processed and delivered to the PDCP apparatus. The NR RLC layer may not include a concatenation function. The function may be performed in the NR MAC layer or may be substituted with a multiplexing function of the NR MAC layer.

In the aforementioned contents, the Out-of-sequence delivery of the NR RLC apparatus refers to a function of directly delivering, to a higher layer, RLC SDUs received from a lower layer regardless of their sequences, may include a function of reassembling and delivering several RLC SDUs if the original one RLC SDU is split into the several RLC SDUs and received, and may include a function of storing RLC SNs or PDCP SNs of received RLC PDUs, ordering the sequences, and recording lost RLC PDUs.

The NR MAC 4-15, 4-30 may be connected to several NR RLC layer apparatuses configured in one UE. Major functions of the NR MAC may include some of the following functions.
Mapping between logical channels and transport channels
Multiplexing/demultiplexing of MAC SDUs
Scheduling information reporting
Error correction through HARQ
Priority handling between logical channels of one UE Priority handling between UEs by means of dynamic scheduling MBMS service identification Transport format selection Padding The NR PHY layer 4-20, 4-25 may perform an operation of channel-coding and modulating high layer data, generating the data into an OFDM symbol, and transmitting the OFDM symbol through a wireless channel or demodulating an OFDM symbol received through a wireless channel, channel-decoding the OFDM symbol, and delivering the OFDM symbol to a higher layer.

Figure 5:
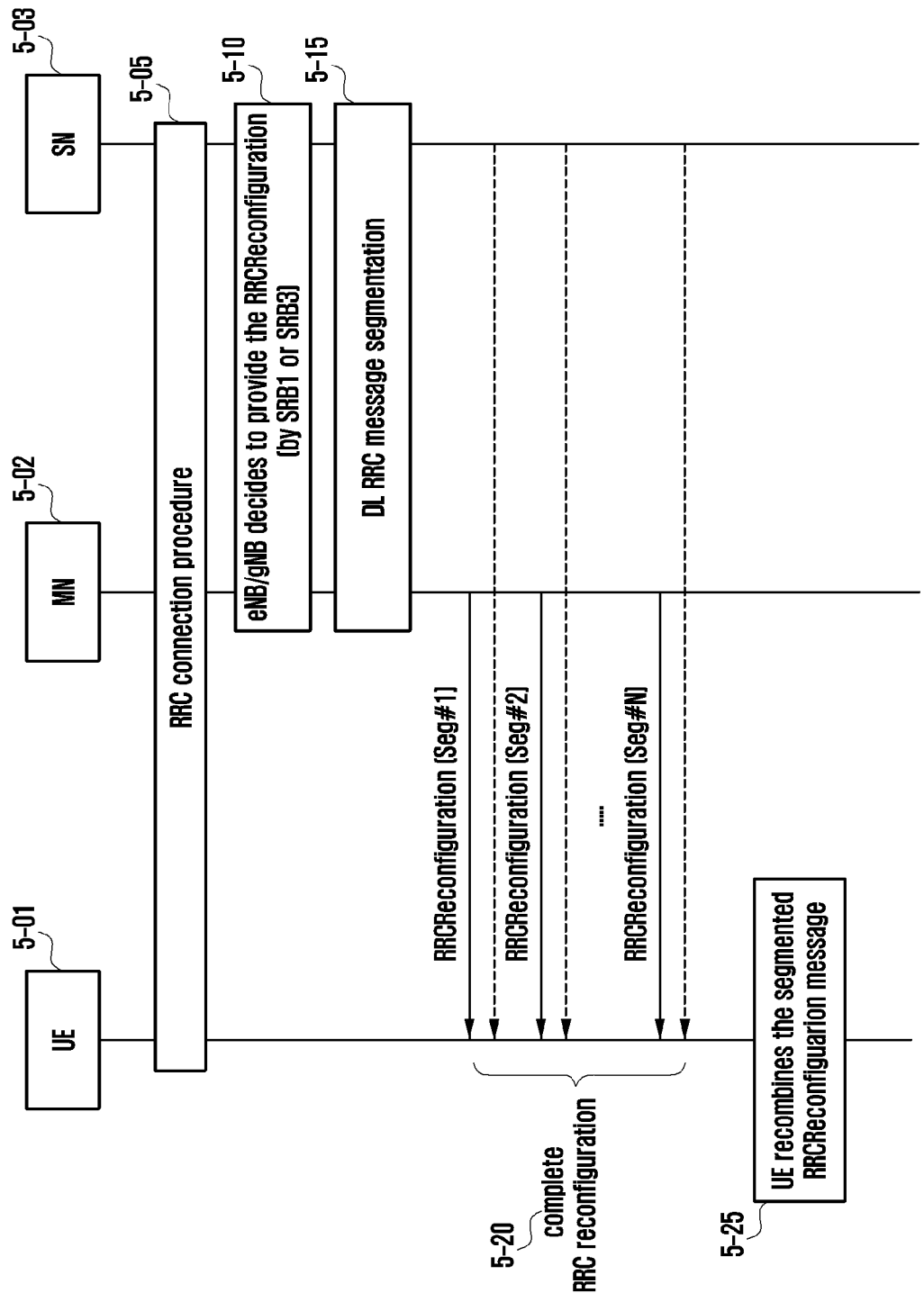
FIG. 5 is a diagram illustrating a method of applying segmentation to an RRC control message through downlink in an NR system according to an embodiment of the disclosure.

FIG. 5 is a diagram illustrating a method of applying segmentation to an RRC control message through downlink in an NR system according to an embodiment of the disclosure. An RRCReconfiguration message and an RRCResume message may be possible as examples of the RRC control message, and a specific DL RRC control message that requires segmentation due to its large size may be applied as an example of the RRC control message. In the following of the disclosure, RRCReconfiguration has been generalized and described as an example, but this does not limit the scope of the disclosure.

Basically, a UE 5-01 needs to receive configuration information for the transmission and reception of data to and from a base station in the state in which the UE has been connected to a serving base station (eNB or gNB) 5-02 (5-05). In step 5-10, the base station 5-02, 5-03 decides to deliver an RRCReconfiguration message to the UE, and generates corresponding information. As in the drawing, in the state in which dual connectivity (hereinafter named DC) has been configured, the following cases may occur depending on how RRCReconfiguration will be delivered.

Case 1: If a master node (MN) generates an RRC message including MCG configuration information, in this case, the base station delivers the generated RRC message through an SRB1.

Case 2: If the MN receives secondary node (SN) configuration information and generates an RRC message including MCG/SCG configuration information, in this case, the base station delivers the generated RRC message through the SRB1.

Case 3: If an SN generates an RRC message including SCG configuration information, in this case, the base station delivers the generated RRC message through an SRB3.

In step 5-15, the base station may apply segmentation to a corresponding RRC control message (e.g., RRCReconfiguration message) when the RRC control message generated in step 5-10 is greater than 9000 bytes, that is, a maximum size of a PDCP SDU. That is, the entire RRCReconfiguration message may be segmented into segments having a size of 9000 bytes, and the last segment may be a segment having a size left by subtracting, from a total message size, the sum of the sizes of the segmented RRC messages segmented as the size of 9000 bytes. In step 5-20, the base station may deliver the produced segmented RRC messages (segmented RRCReconfiguration messages) to the UE one by one. In this case, the delivered segmented RRC messages need to be sequentially delivered according to their sequence numbers, and should not be interrupted by another RRC message. That is, another RRC message is not delivered while the segmented RRC messages are delivered. The UE may store the delivered segmented RRC messages. In step 5-25, after receiving all the segmented RRC messages, the UE may restore the entire RRC message information by decoding and reassembling the received segmented RRC messages.

Figure 6:
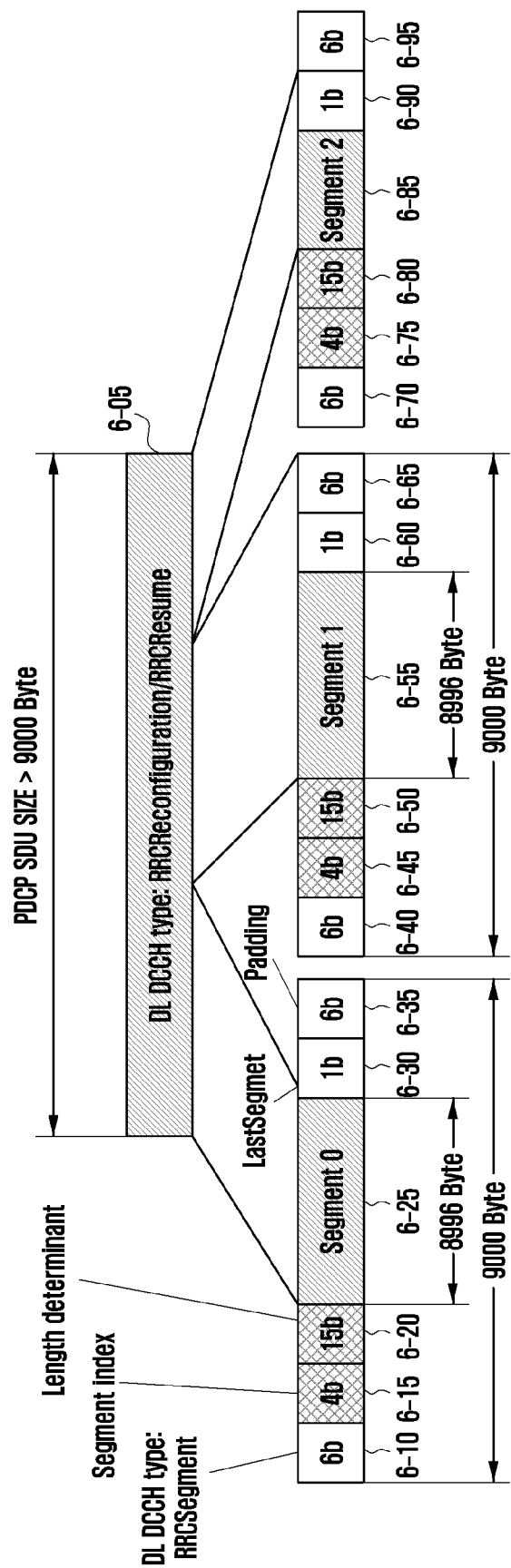
FIG. 6 is a diagram illustrating a method of applying segmentation to a downlink RRC message in an NR system according to an embodiment of the disclosure.

FIG. 6 is a diagram illustrating a method of applying segmentation to a downlink RRC message in an NR system according to an embodiment of the disclosure. A detailed structure of a segmented RRC message is described with reference to this drawing, and an RRCReconfiguration message is described as an example.

If segmentation based on a DL DCCH message is applied, a new DL segmented RRC message may be introduced. For example, a new DL DCCH message called DLDedicatedMessageSegment may be introduced and used to deliver DL segmented RRC. When a completed DL DCCH message 6-05, for example, a DL DCCH message including an RRCReconfiguration message is greater than 9000 bytes, a base station may segment the entire RRCReconfiguration message as 8996 bytes as in 6-25 and 6-55, and may generate a segment message having a 9000-byte size by adding a DL segmented RRC message header of 4 bytes to the segment message. In this case, the size of the message header and the size of the segmented RRC message may vary depending on the size of an introduced field. The last segment message 6-85 may have a size corresponding to a size obtained by subtracting, from a total size, the sum of the sizes of the segment messages having a 9000-byte length.

6 bits 6-10, 6-40, 6-70 for a DL DCCH type configuration (the number of bits for a CHOICE structure and DLDedicatedMessageSegment message indication) and a segment index 6-15, 6-45, 6-75 of 4 bits for a corresponding segmented UE capability information message may be included in the header of the DL segmented RRC message. The segment index is an identifier indicating that the corresponding segmented RRC message corresponds to any one of segments. The example of FIG. 6 corresponds to a case where a maximum segment size has been set to 16. The number of bits may vary depending on a maximum setting value. A corresponding identifier may be always included, but may not be included because a corresponding segment can be delivered in-sequence through a PDCP SN. Instead, an indicator (LastSegment) of 1 bit 6-30, 6-60, 6-90 indicating whether a specific segment is the final segment needs to be included in a corresponding header. If a corresponding LastSegment indicator is indicated as 0 and indicates that a corresponding segment is not the last segment, a UE that receives a corresponding message may be aware that a corresponding packet has a maximum size. Furthermore, padding bits 6-35, 6-65, 6-95 for byte-aligning the packet may be included in the header. The padding bits may be variable depending on previous header bits, a segment size, etc. Furthermore, a length field of 15 bits indicating the length of a segmented RRC message may be included in a header. This means the number of bits for indicating the 8996 bytes.

In the method, if a PDCP SDU size is adjusted as 9000 bytes, a PDCP SN may be added and a PDCP PDU may be generated.

In the following embodiments of the disclosure, if segment is applied to a DL RRC control message, in particular, an RRC reconfiguration message, an overall operation of delivering the corresponding message through a signaling radio bearer 1 (SRB 1) and an SRB 3, that is, the existing transmission method, is described. Furthermore, there are proposed UE and base station operations according to a situation which may occur while the corresponding operation occurs. The aforementioned situation may be an RLF, RRC release, RRC resume, HO, or an SCG change. A detailed operation is described in each of the following embodiments.

Figure 7:
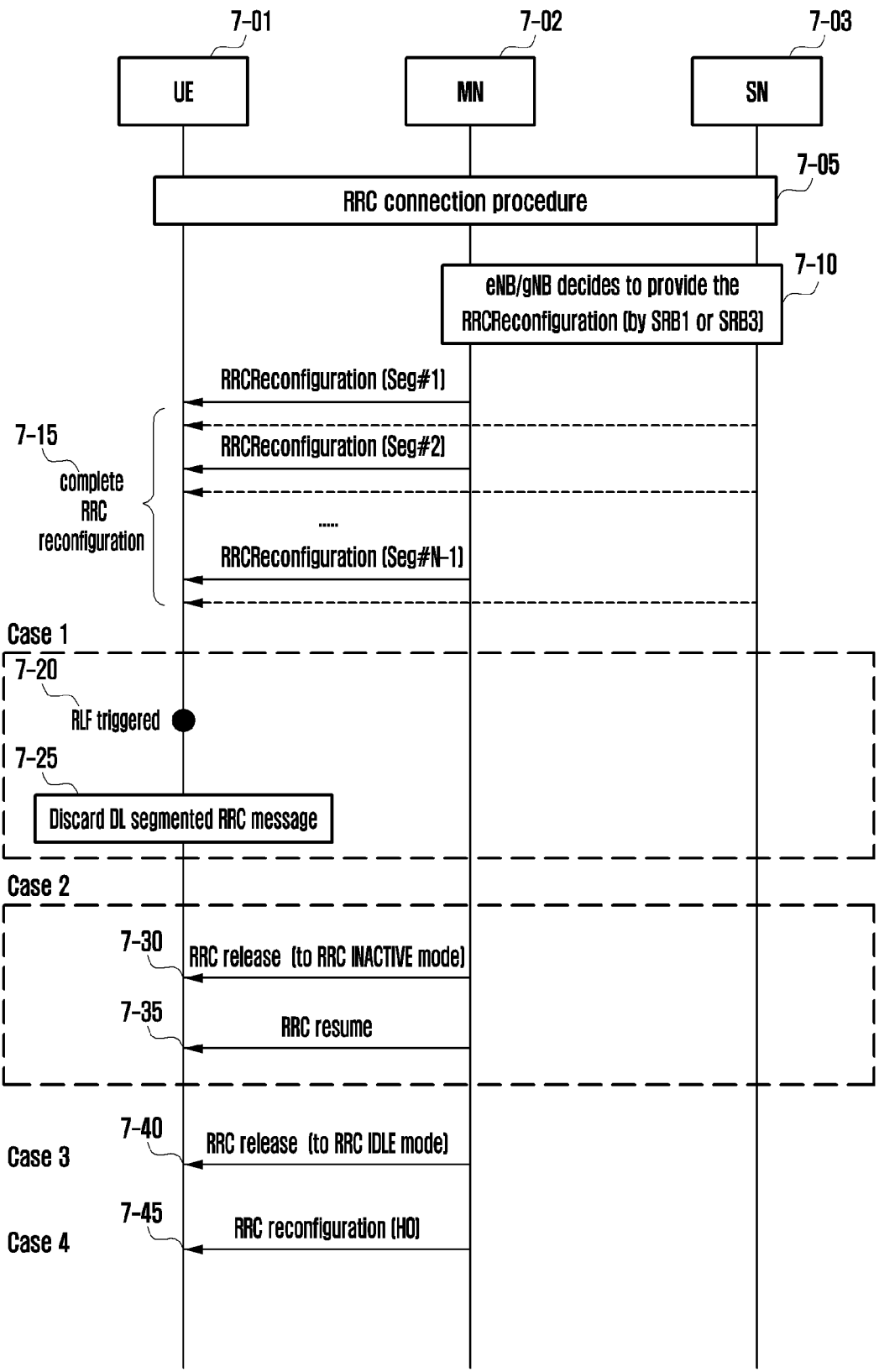
FIG. 7 is a diagram illustrating operations of a UE and a base station in a situation in which segmentation is applied to a downlink RRC message according to an embodiment of the disclosure.

FIG. 7 is a diagram illustrating operations of a UE and a base station in a situation in which segmentation is applied to a downlink RRC message according to an embodiment of the disclosure, and specifically describes an operation according to a specific situation. An RRCReconfiguration message and an RRCResume message may be possible as examples of the RRC control message, and a specific DL RRC control message that requires segmentation due to its large size may be applied as an example of the RRC control message. In the following of the disclosure, RRCReconfiguration is generalized and described. Furthermore, in describing some embodiments of the disclosure, a situation in which dual connectivity (DC) has been configured will be assumed and described, but this is merely for example and does not limit the scope of the disclosure. Embodiments according to the disclosure may also be applied to UE and base station operations in a situation in which DC has not been configured.

Basically, a UE 7-01 needs to receive configuration information for the transmission and reception of data to and from a base station in the state in which the UE has been connected to a serving base station (eNB or gNB) 7-02 (7-05). In this step, the state in which DC has been configured and an MN and an SN have been connected is assumed. In step 7-10, the base station 7-02, 7-03 decides to deliver an RRCReconfiguration message to the UE, and generates corresponding information. As in the drawing, the following cases may occur depending on how RRCReconfiguration will be delivered in the state in which dual connectivity (hereinafter named DC) has been configured.

Case 1: If the master node (MN) generates an RRC message including MCG configuration information, in this case, the base station delivers the generated RRC message through an SRB1.

Case 2: If the MN receives secondary node (SN) configuration information and generates an RRC message including MCG/SCG configuration information, in this case, the base station delivers the generated RRC message through the SRB1.

Case 3: If an SN generates an RRC message including SCG configuration information, in this case, the base station delivers the generated RRC message through an SRB3.

In step 7-15, the base station may apply segmentation to a corresponding RRC control message (e.g., RRCReconfiguration message) when the RRC control message generated in step 7-10 is greater than 9000 bytes, that is, a maximum size of a PDCP SDU. That is, the entire RRCReconfiguration message may be segmented into segments having a size of 9000 bytes, and the last segment may be a segment having a size left by subtracting, from a total message size, the sum of the sizes of the segmented RRC messages segmented as the size of 9000 bytes. A base station operation is described in detail as follows according to the aforementioned cases.

The MN performs a segmentation operation on the generated RRCReconfiguration message (Case 1 and Case 2)

Check whether the generated RRC message is for the MN or the SN

In the case of the RRC message for the MN

The segmented RRCReconfiguration message is contained/generated in DLDedicatedMessageSegment A plurality of DLDedicatedMessageSegment messages in which the entire RRCReconfiguration has been fully contained is delivered through an SRB1

Sequentially delivered through the SRB1 without interruption with another DL RRC message The SN performs a segmentation operation on the generated RRCReconfiguration message (Case 3)

Check whether the generated RRC message is for the MN or the SN

If the generated RRC message is an RRC message for the SN and an SRB3 has been configured Segmented RRCReconfiguration messages are contained/generated in DLDedicatedMessageSegment A plurality of DLDedicatedMessageSegment messages in which the entire RRCReconfiguration has been fully contained is delivered through the SRB3

Sequentially delivered through the SRB3 without interruption with another DL RRC message As described above, in step 7-15, the base station may deliver the produced segmented RRC message(s segmented RRCReconfiguration messages) to the UE through the configured SRB one by one. In this case, the delivered segmented RRC messages need to be sequentially delivered according to their sequence numbers (or segmented indices), and should not be interrupted by another RRC message. That is, another RRC message is not delivered while the segmented RRC messages are delivered. The disclosure proposes UE and base station operations if a specific situation occurs before segmented RRC (DLDedicatedMessageSegment) is fully delivered as in 7-15. For example, there are proposed UE and base station operations when a specific situation occurs in the state in which (N−1) segments have been delivered to a UE through a configured SRB and the last N-th segmented RRC message has not been delivered to the UE if a total of N segmented RRC messages are present. The aforementioned situation may be an RLF, RRC release, RRC resume, HO, an SCG change, etc. for example.

For reference, a case where all segmented RRC messages have been delivered to a UE without any problem has been described with reference to FIG. 5. Cases according to respective situations are more specifically described in the following embodiments. In this drawing, a simple operation is described. Currently, discussion of an RRC message stored in RRC is unnecessary because an operation is performed on the premise that in an RRC layer, an RRC message is immediately transmitted to a lower layer upon occurrence without being stored or is processed immediately when the RRC message is received. However, as an RRC segment is introduced, a segmented RRC message may be stored in the RRC layer, and an operation of explicitly discarding data stored in the RRC layer in a specific case is required.

The first case is a case where a radio link failure (RLF) occurs due to a problem with a radio link in a situation in which a UE has not received all segmented RRC messages (7-20). The UE may receive, from the physical layer, a signal, for example, "out-of-sync (oos)" indicating that a service cannot be received from a base station (MeNB/MgNB) in a situation in which the UE transmits and receives data to and from the base station. If the signal is received by the number of times N310, the UE recognizes a problem with a wireless connection with the base station (MeNB/MgNB) and operates a timer T310. While the timer operates, the UE does not perform an operation for the recovery of a radio link. Furthermore, when an "in-sync" indicator is received from the physical layer by the number of times N311 or an RRC reconfiguration message for re-establishing a connection is received before the timer T310 expires, the timer T310 is stopped. If the timer T310 expires, the UE declares an RLF (7-20) and performs an RRC Connection re-establishment procedure (7-25). The UE performs cell selection, MAC reset, RB suspension, PDCP re-establishment, etc. as the RRC Connection re-establishment procedure. Furthermore, when the RRC Connection re-establishment procedure is started, the UE operates a timer T311 and does not perform a radio link recovery operation while the timer operates. If RRC Connection re-establishment is not performed while the timer T311 operates and the timer T311 expires, a state of the UE transitions to an RRC IDLE state. Conventionally, when the corresponding operation occurs, the PDCP re-establish operation is performed. However, the disclosure proposes an operation of discarding the segmented RRC messages stored in its RRC layer in step 7-25. The discarded segmented RRC message may correspond to a DL segmented RRC message or an UP segmented RRC message or both. Furthermore, in the corresponding step, the base station, like the UE, discards the segmented RRC messages stored in its RRC layer.

The second case is a case where the base station makes a state of the UE transition to an RRC INACTIVE state in a situation in which the UE has not received all the segmented RRC messages (7-30). In this case, the base station may deliver an RRCRelease message by including suspendConfig, that is, configuration information for an INACTIVE mode, in the RRCRelease message. After receiving RRCRelease in step 7-30, a state of the UE transitions to the RRC INACTIVE state according to a configured RRC INACTIVE condition. In step 7-35, the base station performs an RRC RESUME procedure in response to a request from the UE or due to the trigger of the base station at specific timing. The UE that has received the RRCResume message delivered by the base station in step 7-35 performs an operation of re-establishing a PDCP configured in an SRB1 and an SRB3 as a resume operation, and resumes the corresponding SRB1/3. The disclosure proposes an operation of discarding, by the UE, the segmented RRC messages stored in the RRC layer in this step. The discarded segmented RRC message may correspond to a DL segmented RRC message or an UL segmented RRC message, or both. The following is a sentence which may be incorporated into a standard document as an example.

```
1> re-establish PDCP entities for SRB1;
1> Discard DLDedicatedMessageSegment for SRB1
1> resume SRB1;
1> re-establish PDCP entities for SRB3;
1> Discard DLDedicatedMessageSegment for SRB3
1> resume SRB3;
```

The third case is a case where the base station makes a state of the UE transition to an RRC IDLE state in a situation in which the UE has not received all the segmented RRC messages (7-40). In this case, the base station includes, in an RRCRelease message, a configuration indicating transition to an IDLE mode. The UE that has received the corresponding message performs an operation of releasing all configured radio bearers (RBs). This means an operation of releasing RLC associated with the RBs and releasing an SDAP, PDCP, or MAC configuration for all the configured RBs. The disclosure proposes an operation of discarding, by the UE, the segmented RRC messages stored in the RRC layer in this step. The discarded segmented RRC message may be a DL segmented RRC message or an UL segmented RRC message or both. The following is a sentence which may be incorporated into a standard document as an example.

```
1> release all radio resources, including release of the RLC entity,
the MAC configuration and the associated PDCP entity and SDAP for
all established RBs;
    1> Discard all DLDedicatedMessageSegment (for SRB1 and SRB2)
```

The fourth case is a case where the base station handovers the UE to another serving cell or changes a PSCell in a situation in which the UE has not received all the segmented RRC messages (7-45). That is, the fourth case proposes a UE operation in a handover and mobility situation. The UE discards the DL segmented RRC messages of an SRB1 and an SRB3 if handover indication is on, and discards the DL segmented RRC messages of the SRB3 in the case of an SCG change situation. Furthermore, the following cases are also possible.

1. If DiscardOnPDCP is included in SRBToAdd for the SRB1/3 of the received RRCReconfiguration messages, the data of a PDCP and DLDedicatedMessageSegment(s) of RRC are discarded.

2. Alternatively, a new IE (e.g., discardOnRRC) for discarding DLDedicatedMessageSegment is introduced.

| SRB-ToAddMod field descriptions |
|---|
| discardOnPDCP |
| Indicates that PDCP should discard stored SDU and PDU according to TS 38.323 [5]. |

In the aforementioned contents, a case where the UE receives another RRC message in the situation in which the UE has not received all the segmented RRC messages may correspond to a case where handover/mobility configuration is configured for the UE through another SRB if interruption is not permitted in the same SRB. For example, the case may correspond to a case where the UE receives the segmented RRC messages through the SRB1 and receives a request for a PSCell change through the SRB3 or receives the segmented RRC messages through the SRB3 or receives handover indication through the SRB1. Hereinafter, operations of a UE and a base station according to various embodiments of the disclosure are described with reference to drawings. In the entire specification, some of components in the drawings may be omitted without departing from the scope of the disclosure if necessary or may be modified in various ways.

Figure 8:
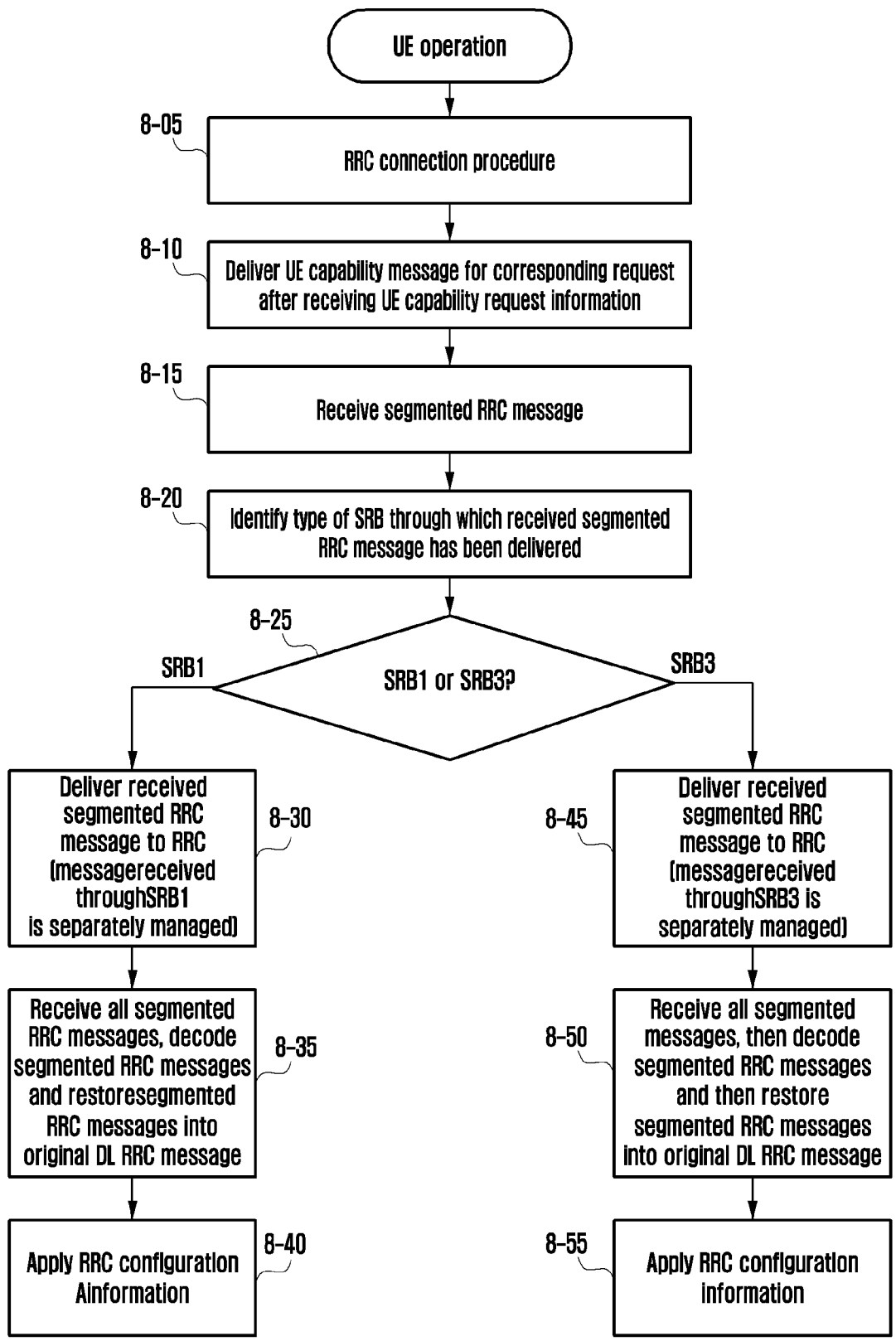
FIG. 8 is a diagram illustrating a UE operation in which segmented RRC control messages are generated and delivered through a specific SRB according to a first embodiment of the disclosure.

FIG. 8 is a diagram illustrating a UE operation in which segmented RRC control messages are generated and delivered through a specific SRB according to a first embodiment of the disclosure.

A UE performs an RRC connection procedure along with a serving base station in step 8-05, and has a procedure of reporting, to the corresponding base station, a capability supported by the UE in step 8-10. That is, in step 8-10, the UE may receive, from the base station, a request that instructs the UE to report UE capability information (UECapabilityEnquiry message). The message may include filtering information (an RAT type, frequency information, etc.) of the UE capability information. When receiving the UECapabilityEnquiry message, the UE generates its own UE capability message (UE capability information) with respect to the UE capability request of the base station, and applies segmentation to the UE capability information when the corresponding message is greater than 9000 bytes, that is, a maximum size of a PDCP PDU. That is, the entire UE capability information message may be segmented into segments having a size of 9000 bytes, and the last segment may be a segment having a size left by subtracting, from a total message size, the sum of the sizes of the segmented RRC messages segmented as the size of 9000 bytes.

In step 8-15, the UE may receive, from the base station, DL segmented RRC messages (DLDedicatedMessageSegment) segmented from an RRCReconfiguration message. In step 8-20, the UE identifies through what SRB the received RRC messages have been delivered.

When the received RRC message is received through an SRB1 based on a delivered SRB type in step 8-25, in step 8-30, the UE delivers the received DL segmented RRC messages to the RRC layer of the UE. In this case, the RRC message received through the corresponding SRB1 is separately managed so that the RRC message is not mixed with an RRC message received through another SRB. In step 8-35, after receiving all the DL segmented RRC messages, the UE performs decoding and restores the DL segmented RRC messages into the RRCReconfiguration message, that is, an original DL RRC message. In the aforementioned contents, the UE may be aware that a received DL segmented RRC message is the last by identifying the last segment indicator in the DL segmented RRC message. In step 8-40, the UE decodes and interprets the restored RRCReconfiguration message and applies RRC configuration information included therein.

When the received RRC message is received through an SRB3 based on a delivered SRB type in step 8-25, in step 8-45, the UE delivers the received DL segmented RRC messages to the RRC layer of the UE. In this case, the RRC message received through the corresponding SRB3 is separately managed so that the RRC message is not mixed with an RRC message received through another SRB. In step 8-50, after receiving all the DL segmented RRC messages, the UE performs decoding and restores the DL segmented RRC messages into the RRCReconfiguration message, that is, an original DL RRC message. In the aforementioned contents, the UE may be aware that a received DL segmented RRC message is the last by identifying the last segment indicator in the DL segmented RRC message. In step 8-55, the UE decodes and interprets the restored RRCReconfiguration message and applies RRC configuration information included therein.

Figure 9:
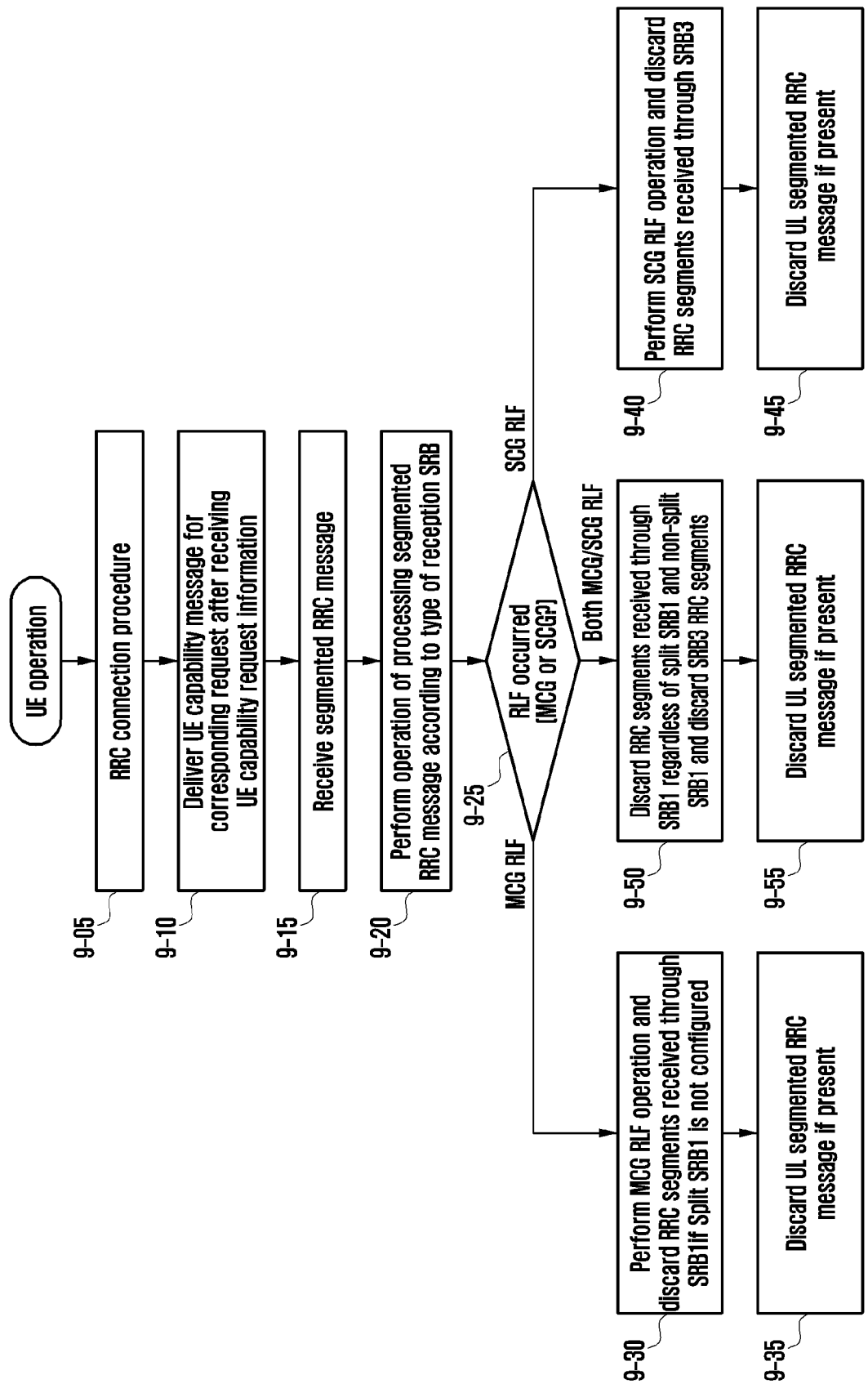
FIG. 9 is a diagram illustrating a UE operation when segmented RRC control messages are generated and delivered through a specific SRB and an RLF occurs according to a second embodiment of the disclosure.

FIG. 9 is a diagram illustrating a UE operation when segmented RRC control messages are generated and delivered through a specific SRB and an RLF occurs according to a second embodiment of the disclosure.

A UE performs an RRC connection procedure along with a serving base station in step 9-05, and has a procedure of reporting, to the corresponding base station, a capability supported by the UE in step 9-10. That is, in step 9-10, the UE may receive, from the base station, a request that instructs the UE to report UE capability information (UECapabilityEnquiry message). The message may include filtering information (an RAT type, frequency information, etc.) of the UE capability information. When receiving the UECapabilityEnquiry message, the UE generates its own UE capability message (UE capability information) with respect to the UE capability request of the base station, and applies segmentation to the UE capability information when the corresponding message is greater than 9000 bytes, that is, a maximum size of a PDCP PDU. That is, the entire UE capability information message may be segmented into segments having a size of 9000 bytes, and the last segment may be a segment having a size left by subtracting, from a total message size, the sum of the sizes of the segmented RRC messages segmented as the size of 9000 bytes.

In step 9-15, the UE may receive, from the base station, DL segmented RRC messages (DLDedicatedMessageSegment) segmented from an RRCReconfiguration message, and may store the received segmented RRC messages. In step 9-20, the UE identifies through what SRB the received RRC messages have been delivered. In the present embodiment, a case where a radio link failure (RLF) occurs in the state in which the last segment of the DL segmented RRC messages has not been received is taken into consideration.

In step 9-25, the UE may identify in which node an RLF has occurred (an MCG RLF or an SCG RLF). If only the MCG RLF has occurred, in step 9-30, the UE performs an MCG RLF operation. That is, if a split SRB1 has not been configured, the UE discards all RRC segments received through an SRB1 or stored therein. With respect to a case where a split SRB1 has been configured, an operation is different based on a link state identified in the SCG. In step 9-35, the UE may also discard all stored UL segmented RRC messages if the UL segmented RRC messages have been stored in the RRC layer of the UE when the MCG RLF occurs. Additionally, the following situations may also be taken into consideration.

An MCG RLF occurs in the state in which an SCG RLF has occurred (no SCG link connection)
    re-establish PDCP for SRB1, discard DLDedicatedMessageSegment
    An MCG RLF occurs in the state in which an SCG has been configured (SCG link present)
    Option 1: re-establish PDCP for SRB1, discard DLDedicatedMessageSegment
    Option 2: re-establish PDCP for SRB1 and SRB3, discard DLDedicatedMessageSegment for SRB1 and SRB3
    An MCG RLF occurs in the state in which an SCG has not been configured
    re-establish PDCP for SRB1, discard DLDedicatedMessageSegment In step 9-25, the UE identifies in which node an RLF has occurred (an MCG RLF or an SCG RLF). If only the SCG RLF has occurred, in step 9-40, the UE performs an SCG RLF operation. That is, the UE discards all RRC segments received through an SRB3 or stored therein. In step 9-45, the UE may also discard all stored UL segmented RRC messages if the UL segmented RRC messages have been stored in the RRC layer of the UE when the MCG RLF occurs.

In step 9-25, the UE identifies in which node an RLF has occurred (an MCG RLF or an SCG RLF). If both the MCG RLF and the SCG RLF have occurred, in step 9-50, the UE performs the following RLF operation.

Discard SRB1 RRC segments regardless of a split SRB1 and a non-split SRB1
    Discard SRB3 RRC segments In step 9-55, the UE may also discard all stored UL segmented RRC messages if the UL segmented RRC messages have been stored in the RRC layer of the UE when the RLFs occur.

Figure 10:
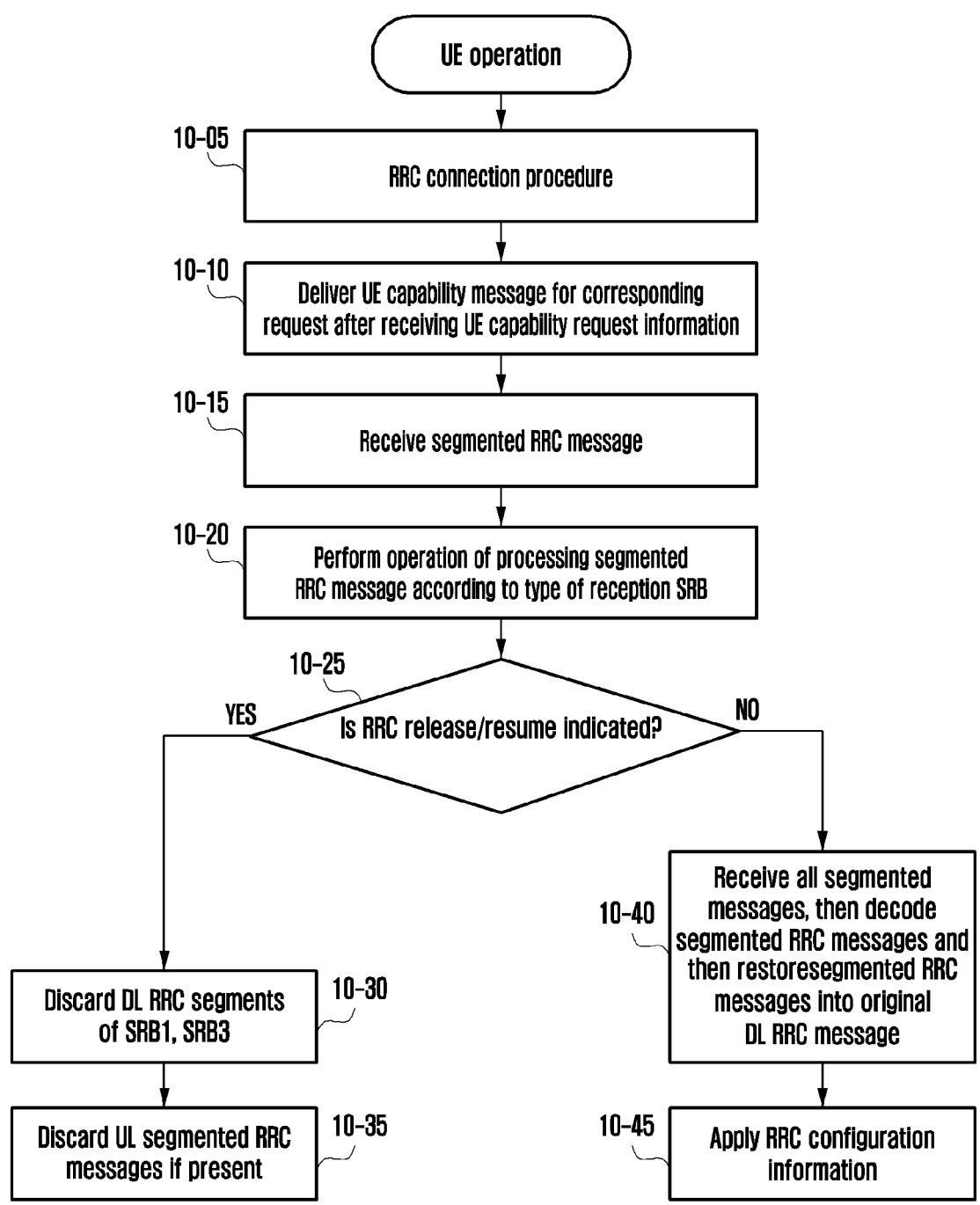
FIG. 10 is a diagram illustrating a UE operation when segmented RRC control messages are generated and delivered through a specific SRB and RRC state transition is indicated according to a third embodiment of the disclosure.

FIG. 10 is a diagram illustrating a UE operation when segmented RRC control messages are generated and delivered through a specific SRB and RRC state transition is indicated according to a third embodiment of the disclosure.

A UE performs an RRC connection procedure along with a serving base station in step 10-05, and has a procedure of reporting, to the corresponding base station, a capability supported by the UE in step 10-10. That is, in step 10-10, the UE may receive, from the base station, a request that instructs the UE to report UE capability information (UECapabilityEnquiry message). The message may include filtering information (an RAT type, frequency information, etc.) of the UE capability information. When receiving the UECapabilityEnquiry message, the UE generates its own UE capability message (UE capability information) with respect to the UE capability request of the base station, and applies segmentation to the UE capability information when the corresponding message is greater than 9000 bytes, that is, a maximum size of a PDCP PDU. That is, the entire UE capability information message may be segmented into segments having a size of 9000 bytes, and the last segment may be a segment having a size left by subtracting, from a total message size, the sum of the sizes of the segmented RRC messages segmented as the size of 9000 bytes.

In step 10-15, the UE may receive, from the base station, DL segmented RRC messages (DLDedicatedMessageSegment) segmented from an RRCReconfiguration message, and may store the received segmented RRC messages. In step 10-20, the UE identifies through what SRB the received RRC messages have been delivered. In the present embodiment, a case where RRC state transition indication is received in the state in which the last segment of the DL segmented RRC messages has not been received is taken into consideration.

In step 10-25, the UE may receive an RRC release or RRC resume message from the base station, and differently performs an operation depending on which message is received. When receiving the RRC release message indicative of transition to RRC IDLE, in step 10-30, the UE performs a release operation for all configured SRBs (an SRB1 and an SRB3) and an operation of discarding the received or stored DL RRC segments. Furthermore, in step 10-35, the UE also discards all stored UL segmented RRC messages if the UL segmented RRC messages are stored in the RRC layer of the UE when indication for RRC IDLE occurs. Additionally, the UE performs an operation of releasing all configured RBs. The operation means an operation of releasing RLC associated with the RBs and releasing an SDAP, PDCP or MAC configuration for all the configured RBs. Furthermore, after the UE receives the RRC release message indicative of transition to RRC INACTIVE in step 10-25 and a state of the UE transitions to INACTIVE, if the UE has received an RRC resume message, in step 10-30, the UE performs a release operation for all configured SRBs (an SRB1 and an SRB3) and an operation of discarding the received or stored DL RRC segments. Furthermore, in step 10-35, the UE also discards all stored UL segmented RRC messages if the UL segmented RRC messages are stored in the RRC layer of the UE when the indication for RRC IDLE occurs.

If the UE has not been received an RRC message indicative of transition to RRC IDLE or INACTIVE in step 10-25, in step 10-40, the UE continues the reception of a segmented RRC message from the received SRB, receives the last segment, and restores corresponding messages into an original RRC message by decoding the corresponding messages. In step 10-45, the UE applies a configuration in the restored RRC message.

Figure 11:
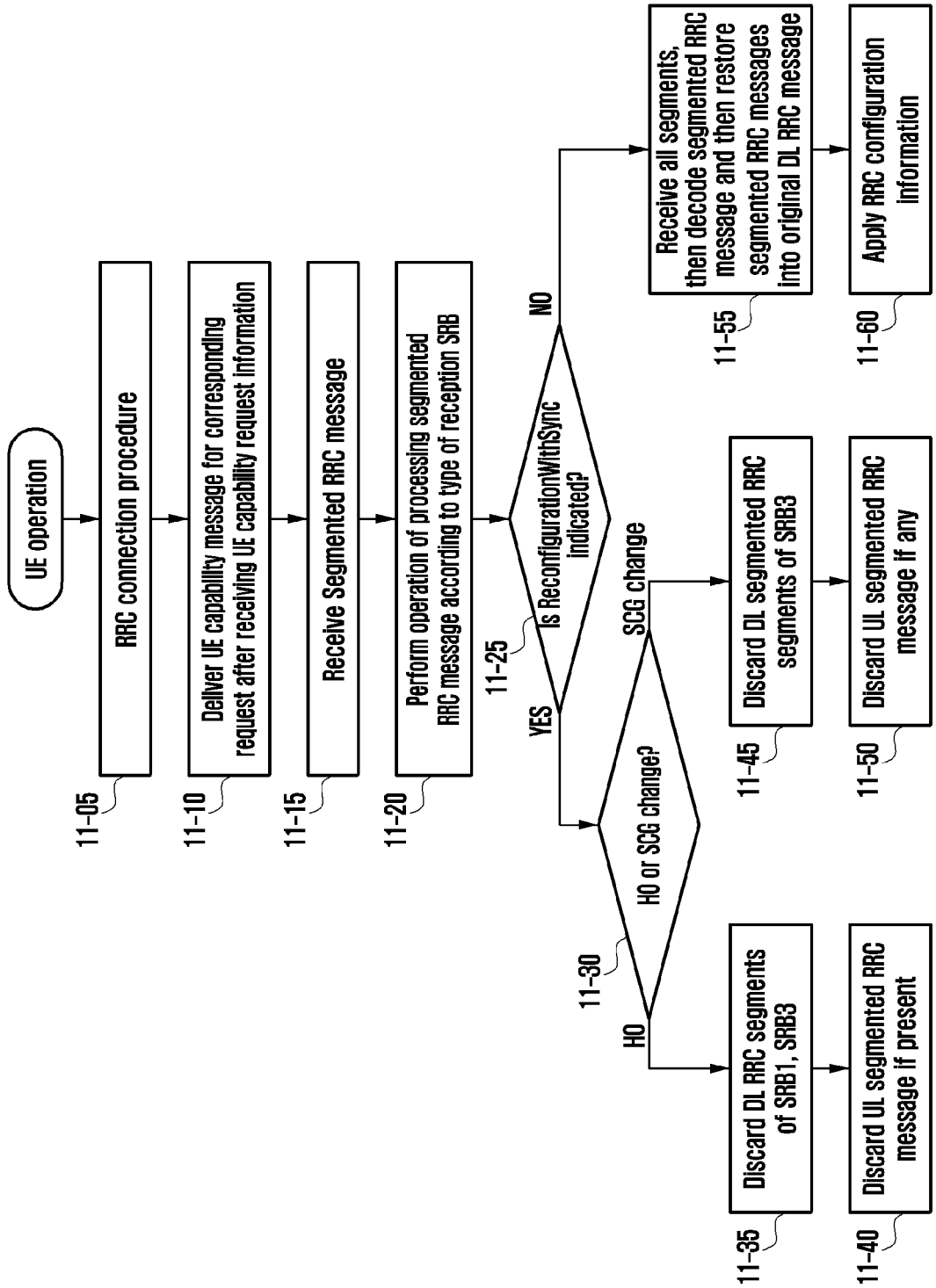
FIG. 11 is a diagram illustrating a UE operation when segmented RRC control messages are generated and delivered through a specific SRB and mobility is indicated, that is, handover or a PSCell change is indicated through an RRC message according to a fourth embodiment of the disclosure.

FIG. 11 is a diagram illustrating a UE operation when segmented RRC control messages are generated and delivered through a specific SRB and mobility is indicated, that is, handover or a PSCell change is indicated through an RRC message according to a fourth embodiment of the disclosure.

A UE performs an RRC connection procedure along with a serving base station in step 11-05, and has a procedure of reporting, to the corresponding base station, a capability supported by the UE in step 11-10. That is, in step 11-10, the UE may receive, from the base station, a request that instructs the UE to report UE capability information (UECapabilityEnquiry message). The message may include filtering information (an RAT type, frequency information, etc.) of the UE capability information. When receiving the UECapabilityEnquiry message, the UE generates its own UE capability message (UE capability information) with respect to the UE capability request of the base station, and applies segmentation to the UE capability information when the corresponding message is greater than 9000 bytes, that is, a maximum size of a PDCP PDU. That is, the entire UE capability information message may be segmented into segments having a size of 9000 bytes, and the last segment may be a segment having a size left by subtracting, from a total message size, the sum of the sizes of the segmented RRC messages segmented as the size of 9000 bytes.

In step 11-15, the UE may receive, from the base station, DL segmented RRC messages (DLDedicatedMessageSegment) segmented from an RRCReconfiguration message, and may store the received segmented RRC messages. In step 11-20, the UE identifies through what SRB the received RRC messages have been delivered. In the present embodiment, a case where mobility control is received in the state in which the last segment of the DL segmented RRC messages has not been received is taken into consideration. A case where handover or a PSCell change is indicated may be included.

In step 11-25, the UE may receive, from the base station, ReconfigurationWithSync included in another RRCReconfiguration message. A handover or PSCell change operation may be indicated through the corresponding message. If the UE receives handover indication in step 11-30, in step 11-35, the UE discards all the DL segmented RRC messages received through an SRB1 and an SRB3 or stored therein. Furthermore, in step 11-40, the UE also discards all stored UL segmented RRC messages if the UL segmented RRC messages are stored in the RRC layer of the UE. In the case of an SCG change situation as a result of a check in step 11-30, in step 11-45, the UE discards the DL segmented RRC messages received through an SRB3 or stored therein. Furthermore, in step 11-50, the UE also discards all stored UL segmented RRC messages if the UL segmented RRC messages are stored in the RRC layer of the UE. Furthermore, when receiving the following indication from the base station, the UE performs the following operation.

1. If DiscardOnPDCP is included in SRBToAdd for the SRB1/3 of a received RRCReconfiguration message, the UE discards the data of a PDCP and DLDedicatedMessageSegment(s) of RRC.

2. Alternatively, the UE may receive a new IE (e.g., discardOnRRC) for discarding DLDedicatedMessageSegment.

| SRB-ToAddMod field descriptions |
| --- |
| discardOnPDCP<br>Indicates that PDCP should discard stored SDU and PDU according to TS 38.323 [5]. |

In the aforementioned contents, a case where the UE receives another RRC message in a situation in which the UE has not fully received all the segmented RRC messages may correspond to a case where handover/mobility configuration is indicated through another SRB if interruption is not permitted in the same SRB. For example, the case may correspond to a case where the UE receives the segmented RRC messages through the SRB1 and receives a request for a PSCell change through the SRB3 or receives the segmented RRC messages through the SRB3 and receives handover indication through the SRB1.

If the UE has not received ReconfigurationWithSync in step 11-25, in step 11-55, the UE continues the reception of a segmented RRC message from the received SRB, receives the last segment, and then restores corresponding messages into an original RRC message by decoding the corresponding messages. In step 11-60, the UE applies a configuration in the restored RRC message.

Figure 12:
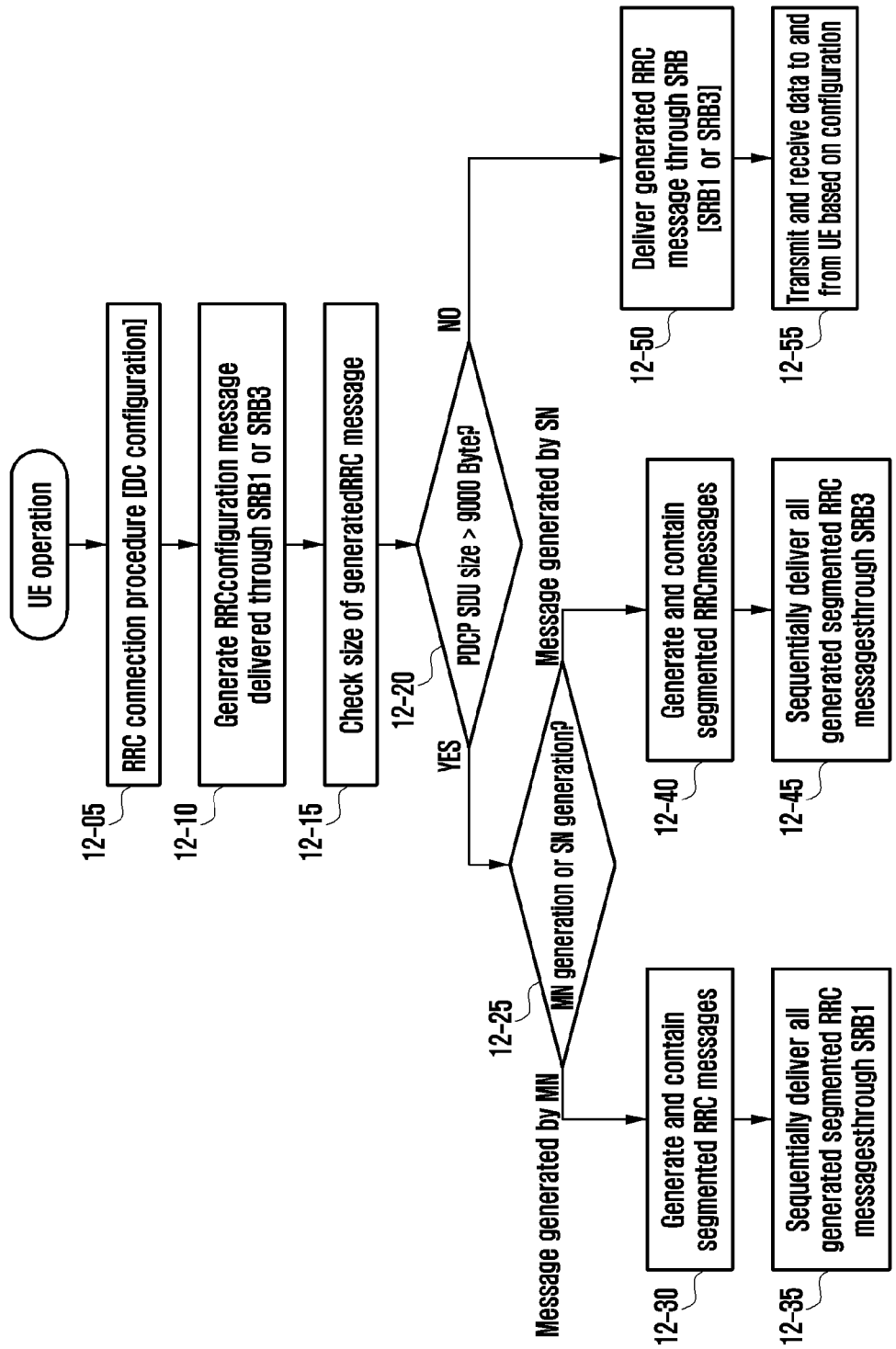
FIG. 12 is a diagram illustrating a base station operation according to an embodiment of the disclosure.

FIG. 12 is a diagram illustrating a base station operation according to an embodiment of the disclosure.

In step 12-05, a serving base station (eNB or gNB) may establish a connection procedure along with a UE. In this step, DC is configured, and thus an MN and an SN may have a state in which they are connected to the UE. In step 12-10, the base station decides to deliver an RRCReconfiguration message to the UE and generates corresponding information. As in the drawing, in the state in which dual connectivity (hereinafter named DC) has been configured, the following cases may occur depending on how RRCReconfiguration will be delivered.

Case 1: If a master node (MN) generates an RRC message including MCG configuration information, in this case, a base station delivers the generated RRC message through an SRB1.

Case 2: If the MN receives secondary node (SN) configuration information and generates an RRC message including MCG/SCG configuration information, in this case, the base station delivers the generated RRC message through the SRB1.

Case 3: If an SN generates an RRC message including SCG configuration information, in this case, the base station delivers the generated RRC message through an SRB3.

In step 12-15, the base station checks whether the RRC control message generated in step 12-10 is greater than 9000 bytes, that is, a maximum size of a PDCP SDU (12-20). When the generated RRC message is greater than 9000 bytes, in step 12-25, the base station identifies whether the corresponding message has been generated from the MN or generated from the SN. If the corresponding message is a message generated from the MN, in step 12-30, the base station generates segmented RRCReconfiguration messages, contains the segmented RRCReconfiguration messages in DLDedicatedMessageSegment, and delivers a plurality of DLDedicatedMessageSegment messages containing all the RRCReconfiguration through the SRB1. In this case, the base station sequentially delivers the plurality of DLDedicatedMessageSegment messages through the SRB1 without interruption with another DL RRC message. If the corresponding message is a message generated from the SN as a result of the identification of a message generation node in step 12-25, that is, the corresponding message is an RRC message for the SN and the SRB3 has been configured, in step 12-40, the base station contains and generates the segmented RRCReconfiguration messages in DLDedicatedMessageSegment and delivers a plurality of DLDedicatedMessageSegment messages containing all the RRCReconfiguration through the SRB3. In this case, the base station sequentially delivers the plurality of DLDedicatedMessageSegment messages through the SRB3 without interruption with another DL RRC message.

When the size of the corresponding message is smaller than 9000 bytes as a result of the check of the generated downlink RRC message in step 12-20, the base station delivers the generated RRC message through an SRB through which the corresponding message has been generated. Thereafter, in step 12-55, the base station performs the transmission and reception of data along with the UE based on configured information.

Figure 13:
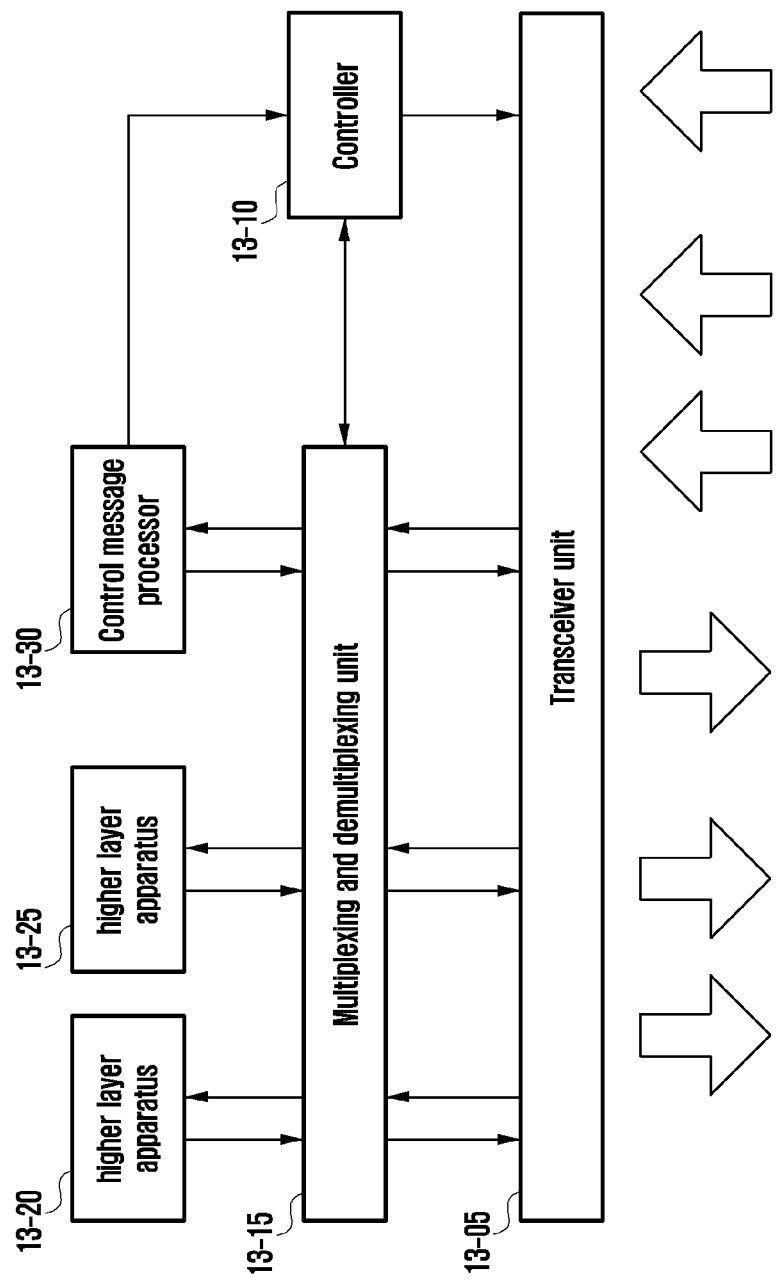
FIG. 13 is a diagram illustrating a configuration of a UE according to an embodiment of the disclosure.

FIG. 13 is a diagram illustrating a configuration of a UE according to an embodiment of the disclosure.

As illustrated in FIG. 13, the UE according to an embodiment of the disclosure includes a transceiver unit 13-05, a controller 13-10, a multiplexing and demultiplexing unit 13-15, various higher layer processors 13-20 and 13-25, and a control message processor 13-30.

The transceiver unit 13-05 receives data and a given control signal through a forward channel of a serving cell, and transmits data and a given control signal through a backward channel thereof. If multiple serving cells have been configured, the transceiver unit 13-05 performs the transmission and reception of data and the transmission and reception of control signals through the multiple serving cells. The multiplexing and demultiplexing unit 13-15 functions to multiplex data generated by the higher layer processor 13-20, 13-25 or the control message processor 13-30 or demultiplex data received from the transceiver unit 13-05 and to deliver the data to a proper higher layer processor 13-20, 13-25 or the control message processor 13-30. The control message processor 13-30 transmits and receives control messages from a base station and takes a required operation. In this case, the required operation includes a function for processing control messages, such as an RRC message and a MAC CE, and includes the report of a CBR measurement value and the reception of an RRC message for a resource pool and a UE operation. The higher layer processor 13-20, 13-25 means a DRB apparatus and may be configured for each service. The higher layer processor 13-20, 13-25 processes data generated in a user service, such as a file transfer protocol (FTP) or a voice over Internet protocol (VoIP), and delivers the data to the multiplexing and demultiplexing unit 13-15 or process data received from the multiplexing and demultiplexing unit 13-15 and delivers the data to a service application of a higher layer. The controller 13-10 identifies a scheduling command received through the transceiver unit 13-05, for example, backward grants, and controls the transceiver unit 13-05 and the multiplexing and demultiplexing unit 13-15 so that backward transmission is performed through a proper transmission resource at proper timing. Meanwhile, in the aforementioned contents, the UE has been described as being composed of a plurality of blocks and the blocks have been described as performing different functions, but this is merely an embodiment and the disclosure is not essentially limited thereto. For example, a function performed by the demultiplex unit 13-15 may be performed by the controller 13-10 itself.

Figure 14:
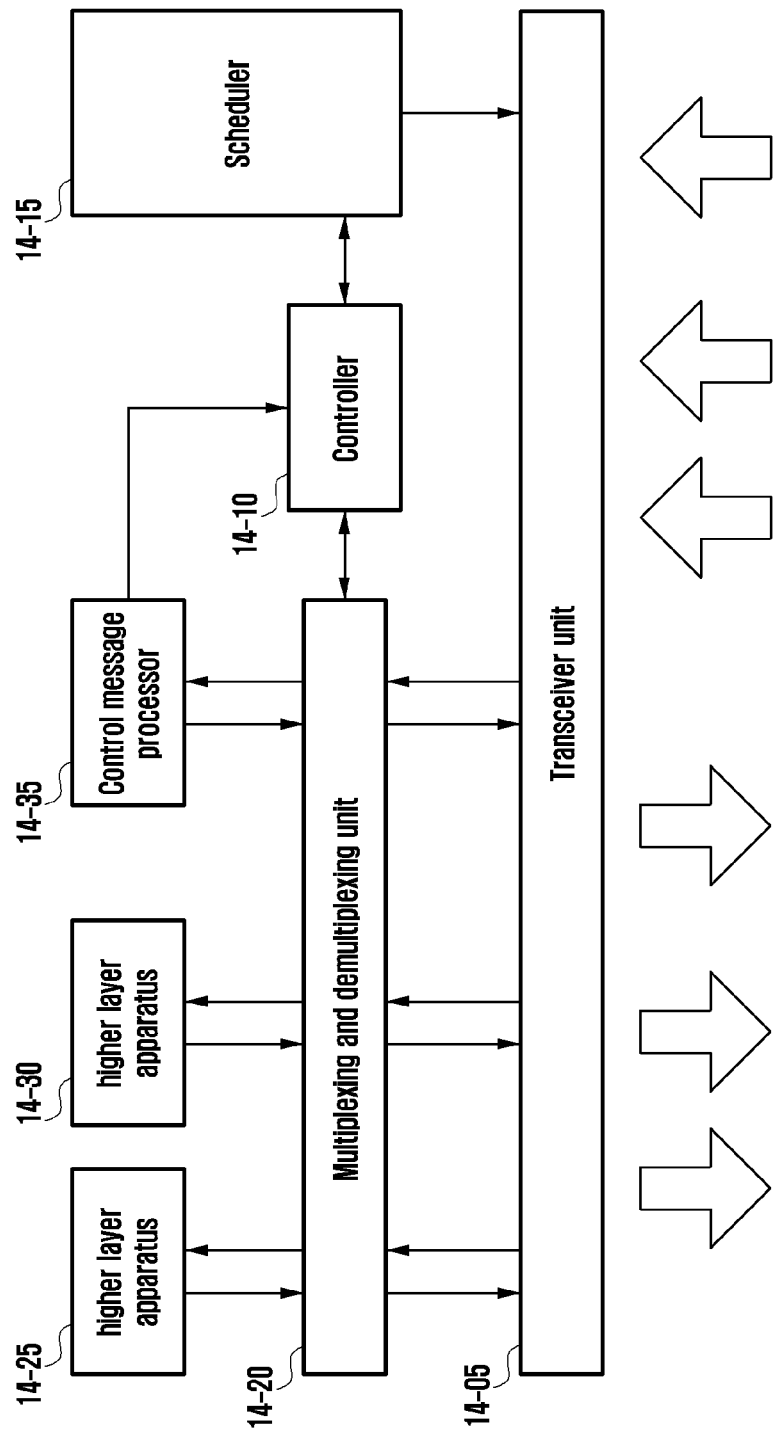
FIG. 14 is a diagram illustrating a configuration of a base station according to an embodiment of the disclosure.

FIG. 14 is a diagram illustrating a configuration of a base station according to an embodiment of the disclosure.

The base station apparatus in FIG. 14 includes a transceiver unit 14-05, a controller 14-10, a multiplexing and demultiplexing unit 14-20, a control message processor 14-35, various higher layer processors 14-25 and 14-30, and a scheduler 14-15.

The transceiver unit 14-05 transmits data and a given control signal through a forward carrier and receives data and a given control signal through a backward carrier. If multiple carriers have been configured, the transceiver unit 14-05 performs the transmission and reception of data and the transmission and reception of control signals through the multiple carriers. The multiplexing and demultiplexing unit 14-20 functions to multiplex data generated by the higher layer processor 14-25, 14-30 or the control message processor 14-35 or demultiplex data received from the transceiver unit 14-05 and to deliver the data to a proper higher layer processor 14-25, 14-30 or the control message processor 14-35 or the controller 14-10. The control message processor 14-35 generates a message to be delivered to a UE in response to an instruction from the controller, and delivers the message to a lower layer. The higher layer processor 14-25, 14-30 may be composed for each service for each UE, and processes data generated in a user service, such as an FTP or a VoIP, and delivers the data to the multiplexing and demultiplexing unit 14-20 or processes data received from the multiplexing and demultiplexing unit 14-20 and delivers the data to a service application of a higher layer. The scheduler 14-15 allocates a transmission resource to a UE at proper timing by taking into consideration, a buffer state of the UE, a channel state, an active time of the UE, etc., and enables the transceiver unit to process a signal transmitted by the UE or to transmit a signal to the UE.

In the aforementioned detailed embodiments of the disclosure, the components included in the disclosure have been expressed in the singular or plural form depending on a proposed detailed embodiment. However, the singular or plural expression has been selected suitably for a situation proposed for convenience of description, and the disclosure is not limited to singular or plural components. Although a component has been expressed in the plural form, it may be configured in the singular form. Although a component has been expressed in the singular form, it may be configured in the plural form.

Although the detailed embodiments have been described in the detailed description of the disclosure, the disclosure may be modified in various ways without departing from the scope of the disclosure. Accordingly, the scope of the disclosure should not be limited to the aforementioned embodiments, but should be defined by not only the claims, but equivalents thereof.

The invention claimed is:

1. A method of a user equipment in a communication system, comprising: receiving, from a base station, a UE capability enquiry message;
   transmitting, to the base station, at least one segment of a UE capability information message based on a size of the UE capability information message is greater than a maximum size of a packet data convergence protocol (PDCP) service data unit (SDU);
   receiving, from the base station, at least one segment of a first radio resource control (RRC) message;
   storing the at least one segment of the first RRC message;
   receiving, from the base station, a second RRC message indicative of transition to an RRC IDLE state; and
   discarding the stored at least one segment of the first RRC message upon transition to the RRC IDLE state based on the second RRC message indicative of transition to the RRC IDLE state.

2. The method of claim 1, wherein a size of the first RRC message is greater than the maximum size of the PDCP (SDU).

3. The method of claim 1, wherein the at least one segment of the first RRC message includes at least one segment of an RRC reconfiguration message or at least one segment of an RRC resume message.

4. A user equipment (UE) of a communication system, comprising:
   a transceiver unit; and a controller configured to:
   receive, from a base station, a UE capability enquiry message,
   transmit, to the base station, at least one segment of a UE capability information message based on a size of the UE capability information message is greater than a maximum size of a packet data convergence protocol (PDCP) service data unit (SDU),
   receive, from the base station, at least one segment of a first radio resource control (RRC) message,
   store the at least one segment of the first RRC message,
   receive, from the base station, a second RRC message indicative of transition to an RRC IDLE state, and
   discard the stored at least one segment of the first RRC message upon transition to the RRC IDLE state based on the second RRC message indicative of transition to the RRC IDLE state.

5. The UE of claim 4, wherein a size of the first RRC message is greater than the maximum size of (PDCP) (SDU).

6. The UE of claim 4, wherein the at least one segment of the first RRC message includes at least one segment of an RRC reconfiguration message or at least one segment of an RRC resume message.

* * * * *